United States Patent
Lam et al.

(10) Patent No.: US 9,423,516 B2
(45) Date of Patent: Aug. 23, 2016

(54) SYSTEMS AND METHODS FOR SPENT FUEL POOL SUBCRITICALITY MEASUREMENT AND MONITORING

(71) Applicant: WESTINGHOUSE ELECTRIC COMPANY LLC, Cranberry Township, PA (US)

(72) Inventors: Ho Q. Lam, Verona, PA (US); Vefa N. Kucukboyaci, Pittsburgh, PA (US); Yung-An Chao, Shanghai (CN); Robert W. Flammang, Pittsburgh, PA (US); William H. Slagle, Frederick, MD (US); Patrick J. Sebastiani, Monroeville, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 527 days.

(21) Appl. No.: 13/908,153

(22) Filed: Jun. 3, 2013

(65) Prior Publication Data
US 2014/0270040 A1 Sep. 18, 2014

Related U.S. Application Data

(60) Provisional application No. 61/792,334, filed on Mar. 15, 2013.

(51) Int. Cl.
| | |
|---|---|
| *G21C 19/40* | (2006.01) |
| *G01T 3/08* | (2006.01) |
| *G21C 17/108* | (2006.01) |
| *G21C 19/07* | (2006.01) |

(52) U.S. Cl.
CPC .............. *G01T 3/08* (2013.01); *G21C 17/108* (2013.01); *G21C 19/07* (2013.01); *G21C 19/40* (2013.01)

(58) Field of Classification Search
CPC ....... G21C 19/40; G21C 17/108; G21C 19/07
USPC ........................... 376/254, 255, 259
See application file for complete search history.

(56) References Cited

U.S. PATENT DOCUMENTS

| | | | | |
|---|---|---|---|---|
| 4,305,786 | A | * 12/1981 | Schultz | G21C 19/40 376/254 |
| 4,325,785 | A | * 4/1982 | Klotz | G21C 17/104 376/254 |

(Continued)

FOREIGN PATENT DOCUMENTS

JP 2013-003001 1/2013

OTHER PUBLICATIONS

Dulloo et al, "Simultaneous Measurement of Neutron and Gamma-Ray Radiation Levels from a TRIGA Reactor Core Using Silicon Carbide Semiconductor Detectors", IEEE Transactions on Nuclear Science, vol. 46, No. 3, Jun. 1999.*

*Primary Examiner* — Jack W Keith
*Assistant Examiner* — Daniel Wasil
(74) *Attorney, Agent, or Firm* — Joseph C. Spadacene; Westinghouse Electric Company LLC

(57) ABSTRACT

A system and method for measuring and monitoring axial flux to determine subcriticality in a spent fuel pool of a nuclear power plant. In certain embodiments of this invention, one or more neutron detectors are operable to generate signals resulting from neutron interactions in the spent fuel pool, a counting device counts the signals which are generated by the one or more neutron detectors, a connecting means electrically connects the one or more neutron detectors to the counting device, a signal analyzer is used to determine reactivity of the fuel assemblies in the spent fuel pool based on the counted signals, a power supply provides power for the neutron detectors, the counting device and the system analyzer, and a software code containing an axial flux curve index is used to correlate the counted signals to determine the subcriticality of the spent fuel pool.

8 Claims, 2 Drawing Sheets

(56) References Cited

U.S. PATENT DOCUMENTS

| | | | | |
|---|---|---|---|---|
| 4,582,672 A * | 4/1986 | Tuley | | G21C 9/00 376/254 |
| 4,588,547 A * | 5/1986 | Impink | | G21C 17/104 376/254 |
| 5,969,359 A | 10/1999 | Ruddy et al. | | |
| 2004/0101082 A1 * | 5/2004 | Chao | | G21C 19/40 376/254 |
| 2013/0083879 A1 * | 4/2013 | Heibel | | G21C 17/00 376/153 |

* cited by examiner

SYSTEMS AND METHODS FOR SPENT FUEL POOL SUBCRITICALITY MEASUREMENT AND MONITORING

BACKGROUND

1. Field

This invention pertains generally to spent fuel pools in nuclear power plants and, more particularly, to systems and methods for measuring and monitoring axial flux to evaluate subcriticality in a spent fuel pool.

2. Description of Related Art

The generation of electric power in a nuclear power plant is accomplished by the nuclear fission of radioactive materials. Due to the volatility of the nuclear reaction, nuclear power plants are required by practice to be designed in such a manner that the health and safety of the public is assured.

In conventional nuclear power plants used for generating electric power, the nuclear fuel becomes spent and is removed at periodic intervals from the nuclear reactor and replaced with fresh fuel. The spent fuel generates decay heat and remains radioactive after it has been removed from the nuclear reactor. Thus, a safe storage facility is provided to receive the spent fuel. In nuclear reactors, such as pressurized water reactors, a pool is provided as a storage pool for the spent fuel. The spent fuel pool is designed to contain a level of water such that the spent fuel is stored underwater. The spent fuel pool is typically constructed of concrete and is at least 40 feet deep. In addition to the level of the water being controlled and monitored, the quality of the water is also controlled and monitored to prevent fuel degradation when it is in the spent fuel pool. Further, the water in the spent fuel pool is continuously cooled to remove the heat which is produced by the spent fuel.

A spent fuel pool in a nuclear power plant typically consists of more than several hundred fuel assembly storage racks filled with either depleted or fresh fuel assemblies. Reactivity of the pool is expressed by a neutron effective multiplication factor, k-effective. The value of k-effective is typically determined by analytical means, such as by the use of Monte Carlo simulations.

Known storage configurations in the spent fuel pool can include close-packed, checker-boarding with empty water cells, and with or without neutron absorbers. The selected storage configuration depends on the reactivity of the depleted assemblies. The storage configuration is selected to ensure that the overall reactivity of the pool remains below regulatory limits.

Monitoring and controlling the margin of subcriticality in the spent fuel pool can assure safe operation of the pool. It is known to obtain this information by means of analytical methods which are based on conservative input assumptions to encompass a wide range of core operating parameters for depleted fuel assemblies. As a result, a considerable amount of subcritical margin may exist in the spent fuel pool based on the analytical results.

Due to a lack of reprocessing and a shortage of permanent disposal sites, commercial nuclear utilities are interested in systems and methods to increase storage capability as some nuclear power plants operate near full capacity in the spent fuel pool. Higher initial enrichments in close-packed storage configurations and degradation problems with reactivity control materials are a couple of the factors which compound the uncertainty associated with pool reactivity and therefore, creates regulatory concerns over the safe operation of spent fuel pools.

Thus, there is a desire in the nuclear power industry to develop a system and method for measuring k-effective with increased certainty and decreased margin so as to achieve at least one of the following benefits: (1) an increase in the amount of soluble boron that can be credited and thereby effectively increasing the storage capacity, reducing the number of different and complex storage configurations, and simplifying the technical specification compliance, and (2) eliminate the regulatory concerns on the uncertainties as to whether there is enough margin to criticality or whether the regulatory limits are satisfied.

This invention addresses the issues above-described by providing systems and methods for measuring and monitoring the margin of subcriticality in the spent fuel pool which is based on measuring axial flux in the spent fuel pool, generating an axial flux curve, and correlating the curve with analytical data to determine the k-effective and monitor any reactivity changes, e.g., inadvertent and anticipated, in the spent fuel pool.

SUMMARY

In one aspect, this invention provides a system for measuring and monitoring axial flux to determine subcriticality in a spent fuel pool of a nuclear power plant. The system includes one or more neutron detectors which are operable to generate signals resulting from neutron interactions in the spent fuel pool, a counting device for counting said signals generated by the one or more neutron detectors, a connecting means to electrically connect the one or more neutron detectors to the counting device, a signal analyzer to determine reactivity of the fuel assemblies in the spent fuel pool based on counted signals, a power supply for the neutron detectors, the counting device and the signal analyzer, and a software code to correlate the counted signals to a predetermined axial flux curve index to determine the subcriticality of the spent fuel pool.

In another aspect, this invention provides a method for measuring and monitoring axial flux to evaluate subcriticality in a spent fuel pool of a nuclear power plant. The method includes determining a plurality of highly reactive regions in the spent fuel pool, measuring axial flux at the plurality of regions for a plurality of soluble boron concentrations, generating measured axial flux data, plotting measured axial flux data to generate a measured axial flux curve for each of the plurality of soluble boron concentrations, determining a slope for the measured axial flux curve, correlating the slope of the measured axial flux curve with a slope of an axial flux curve index generated from predetermined analytical data, and determining k-effective for the measured axial flux curve.

BRIEF DESCRIPTION OF THE DRAWINGS

A further understanding of the invention can be gained from the following description of the preferred embodiments when read in conjunction with the accompanying drawings in which.

DETAILED DESCRIPTION OF PREFERRED EMBODIMENTS

Figure 1:
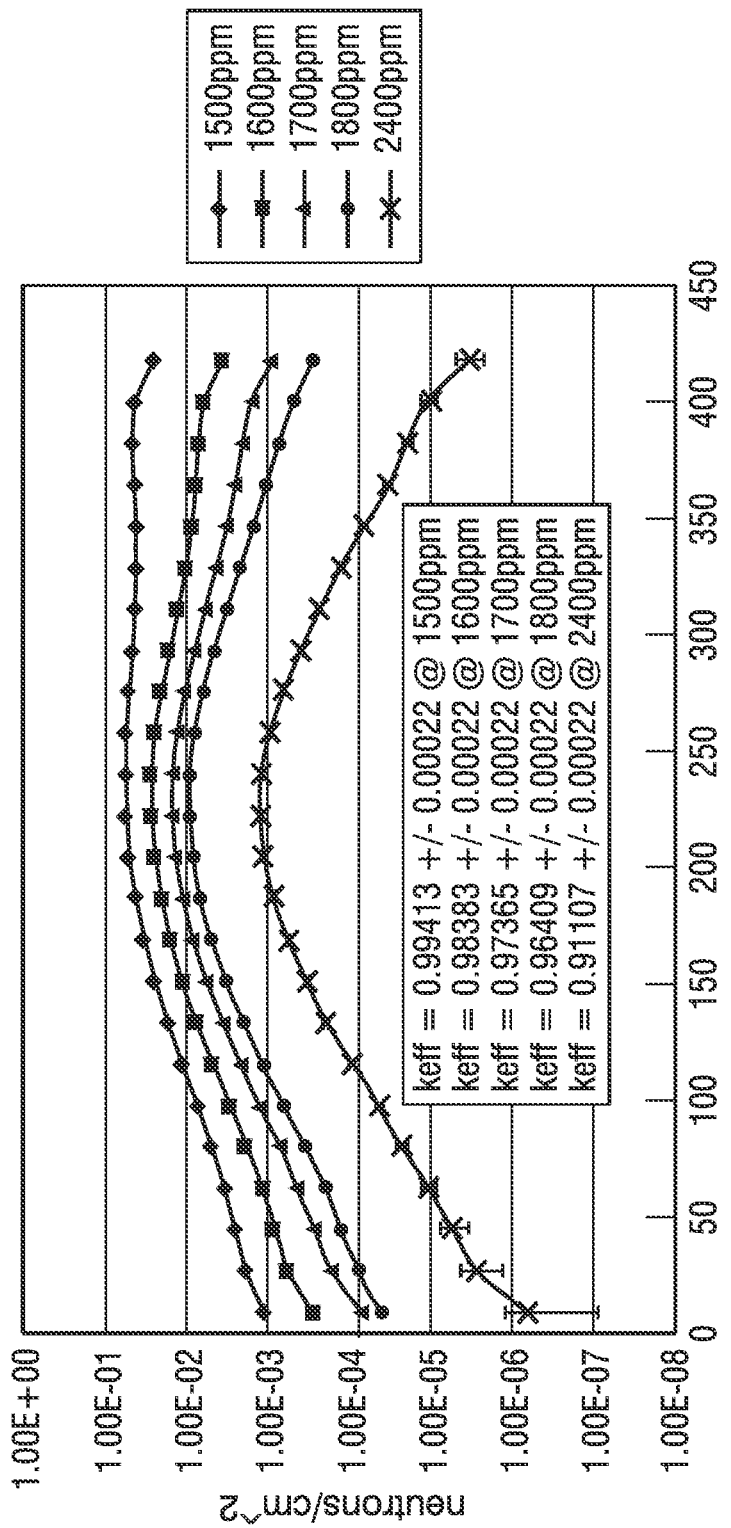
FIG. 1 shows plotted curves of results of Monte Carlo simulations for an array of depleted fuel assemblies stored in a spent fuel pool, in accordance with certain embodiments of this invention.

This invention relates to systems and methods for measuring and monitoring axial flux in a spent fuel pool of a nuclear power plant to evaluate the degree of subcriticality in the spent fuel pool. Generally, the systems and methods of this invention evaluate the degree of subcriticality using the shape of the axial flux distribution in the presence of a neutron source. The measurement system includes neutron detectors, a signal analysis system and neutron source in the spent fool pool. The signal analysis system contains a correlation curve for the axial shape index to the degree of subcriticality.

In certain embodiments, the nuclear power plant is a pressurized water reactor. A typical spent fuel pool in a nuclear power plant, such as a pressurized water reactor, consists of more than several hundred fuel assembly storage racks filled with either depleted or fresh fuel assemblies. Reactivity of the spent fuel pool is expressed by the neutron effective multiplication factor, k-effective, and is controlled by various means, such as, for example, high concentration of soluble boron in the spent fuel pool water and other fixed or movable neutron absorbing devices which act as neutron absorbers for reactivity hold-down. Neutron absorbing devices can include borated stainless steel racks, Boral panels and Metamic inserts.

The fuel assemblies can be stored in the spent fuel pool in various configurations, such as, close-packed and checkerboarding with empty water cells, with or without neutron absorbers. The particular configuration employed depends on the reactivity of the depleted assemblies. The reactivity of the depleted assemblies can depend on the initial enrichment, burn-up, depletion history and cooling period (e.g., the time after discharge from the reactor core). The storage configuration is selected with the objective of ensuring that the overall reactivity of the spent fuel pool remains below regulatory limits. In the United States, the Nuclear Regulatory Commission (NRC) establishes requirements for the safe operation of nuclear power plants. Currently, the NRC requirements are that k-effective of the spent fuel pool shall not exceed 0.95 in normal conditions and k-effective is to remain less than 1.0 with no soluble boron present, if credit is taken for the presence of soluble boron in normal operations.

In general, the amount or degree that the spent fuel pool is subcritical is useful in assessing whether the spent fuel pool is being operated and maintained in a safe condition. Typically, this information is obtained by analytical methods which are based on very conservative input assumptions to encompass a wide range of core operating parameters with which the fuel assemblies can be depleted. As a result, a considerable amount of subcritical margin may exist in the spent fuel pool. Particularly, in the presence of high concentrations of soluble boron.

Without being bound by any particular theory, it is believed that determining and evaluating the amount or degree that the spent fuel pool is subcritical by employing systems and methods that use measured values (e.g., axial flux measurements) directed to actual operating parameters will provide advantages over the known conservative systems and methods. For example, at least one of the following benefits may be realized in generating a measured k-effective value: (1) increasing the amount of soluble boron that can be credited thereby effectively increasing the storage capacity, reducing the number of different and complex storage configurations, and simplifying the technical specification compliance, and (2) eliminating regulatory concerns on the uncertainties as to whether there is sufficient margin to criticality or if the regulatory limits are satisfied.

In this invention, measuring and monitoring systems and methods that are based on the sensitivity of flux shape versus the degree of subcriticality are used to determine the k-effective and evaluate any reactivity changes (e.g., inadvertent and anticipated) in the spent fuel pool. In general, axial flux in the spent fuel pool environment is measured such that a degree of subcriticality can be determined or inferred therefrom.

Various methods and devices for measuring axial flux in a spent fuel pool are known in the art. These known and conventional methods and devices are suitable for use in this invention. In this invention, the axial flux is measured in the most reactive regions of the spent fuel pool because, without intending to be bound by any particular theory, it is believed that the k-effective of the spent fuel pool is driven by the most reactive region of the spent fuel pool and therefore, the degree of subcriticality can be inferred based on the axial flux measurement in the most reactive fuel assembly.

In certain embodiments, for example, in a pressurized water reactor, the top portion of a depleted fuel assembly is significantly under-burned relative to the middle portion due to axial power and moderator density profiles during depletion. When the depleted assembly is placed in the spent fuel pool, a majority of the reactivity contribution will be as a result of the top portion of the assembly. The most reactive regions can be determined using various methods and devices known in the art. In certain embodiments, the most reactive regions are determined by simulations, such as by using Monte Carlo analysis.

The existence of neutron flux in a subcritical spent fuel pool is maintained by extraneous neutron sources in the pool. Without intending to be bound by any particular theory, it is believed that when there exists a significant margin of subcriticality in the spent fuel pool, e.g., the pool is not close to criticality, the axial flux will depend on the extraneous source (in addition to the small amount of spontaneous fission source). When there is a small margin of subcriticality in spent fuel pool, e.g., the pool is close to approaching criticality, the axial flux will change as the number of neutrons from induced chain reaction fissions increases and starts to drive axial flux. This behavior is demonstrated in FIG. 1 which shows results of Monte Carlo simulations for an array of depleted fuel assemblies stored in the spent fuel pool. In this assembly configuration, a fixed neutron source provides a constant stream of neutrons around the midplane of the fuel assembly. The subcriticality of the spent fuel pool is varied either by changing the soluble boron concentration or the configuration of the spent fuel pool. For illustration purposes, axial flux measurements were taken in the spent fuel pool at varying soluble boron concentrations, particularly, 1500 ppm, 1600 ppm, 1700 ppm, 1800 ppm and 2400 ppm. These measurements were plotted to generate a curve or shape of axial flux for each of the soluble boron concentrations. As seen from FIG. 1, the axial flux shape is mid-peaked due to the fixed neutron source in a highly subcritical pool (e.g., high boron concentration of 2400 ppm). As the spent fuel pool approaches criticality, the induced fission reactions in the top portions of the assembly start generating more neutrons relative to the fixed source, thereby skewing the axial flux shape. The top portions of the assembly are significantly under-burned and therefore, more reactive.

In certain embodiments, axial flux measurements are taken in the spent fuel pool at various soluble boron concentrations. The measurements are plotted for each of the soluble boron concentrations and curves or shapes are generated such that each boron concentration has an axial flux curve or shape associated therewith. The plotting of the data to obtain a curve or shape can be conducted manually or by use of an electronic device. The slope of these curves or shapes can be determined using conventional methods and devices known in the art.

Further, axial flux curves or shapes for a spent fuel pool can be analytically obtained for selected soluble boron concentrations using analytical tools such as Monte Carlo analysis (e.g., simulation). As a result, an axial shape curve index can be generated. The slope of the analytical curves or shapes can be determined using the analytical tools. The slope value can be used to obtain a k-effective value.

The curves or shapes derived from measured axial flux data can be correlated with the axial flux curves or shapes index derived from analytical data. For example, the slope of the curve or shape derived from measured axial flux can be correlated with the slope of the axial flux curves or shapes index. As a result of this correlation, a k-effective value for each of the measured axial flux curves or shapes is obtained.

In accordance with certain embodiments of the invention, the following simplified analysis demonstrates analytically the flux behavior in a subcritical system in the presence of an extraneous source. The following cases are considered: (I) one-group and one-dimensional homogeneous medium without chain reaction fission and (II) one-group and one-dimensional homogeneous medium with chain reaction fission.

I. Analysis without Chain Reaction Fission Term

The diffusion equation for this analysis with a point source located at x=0 is, $$-D(d^2\phi/dx^2)+\Sigma_a\phi=S\delta(x) \quad (1).$$

The flux shape is given by the solution of the equation away from the source location, $$-D(d^2\phi/dx^2)+\Sigma_a\phi=0 \quad (2).$$

In terms of the diffusion length, L, Equation 2 can be rewritten as, $$-L^2(d^2\phi/dx^2)+\phi=0 \quad (3)$$

wherein, $$L=\sqrt{(D/\Sigma_a)} \quad (4).$$

The solution to Equation 3 is the simple exponential function in Equation 5, with its magnitude set by the source strength in Equation 1, $$\omega(x)=SL/2D\exp(-x/L) \quad (5).$$

II. Analysis with Chain Reaction Fission Term

The above Analysis I is modified by adding to it the chain reaction fission term as follows, $$-D(d^2\omega/dx^2)+\Sigma_a\phi=\Sigma_f\phi+S\delta(x) \quad (6).$$

Equation 6 can be written as, $$-D(d^2\phi/dx^2)+\Sigma_a(1-\Sigma_f/\Sigma_a)\phi=S\delta(x) \quad (7).$$

In terms of the multiplication factor, k, or the subcriticality (1−k), Equation 7 can be rewritten as, $$-D(d^2\phi/dx^2)+\Sigma_a(1-k)\phi=S\delta(x) \quad (8)$$

wherein, $$k=\Sigma_f/\Sigma_a \quad (9)$$

and $$L=\sqrt{(D/\Sigma_a)} \quad (4).$$

The comparison of Equation 8 with Equation 1, shows that the absorption cross-section is multiplied with the subcriticality factor (1-k) and therefore the flux distribution in Equation 5 is changed correspondingly to the following general form, $$\phi(x)=(SL/2D\sqrt{(1-k)})\exp(-x\sqrt{(1-k)}/L)) \quad (10).$$

The above equation demonstrates how the exponent varies with the subcriticality. The further the spent fuel pool is to being critical, the steeper is the exponential slope. As the spent fuel pool approaches criticality, the flux distribution approaches a flat constant which is the fundamental mode for a homogeneous medium.

In certain embodiments, the methods and systems of this invention includes a neutron detectors system installed in the spent fuel pool. The neutron detector system can be selected from those which are known in the art and commercially available. Suitable neutron detector systems for use in this invention include those systems which are capable of operating in the spent fuel pool environment. The neutron detector system includes one or more neutron detectors which are operable to and capable of generating signals as a result of detecting neutron interaction in the spent fuel pool. It is preferable for the neutron detector to be relatively small in size such that it can fit amongst and around the fuel storage racks. In particular, a plurality of neutron detectors is installed in the most reactive regions in the spent fuel pool. In certain embodiments, each of the neutron detectors includes at least one silicon carbide (SiC) semiconductor diode and the associated electronics. A SiC detector is typically compact. For example, the detector diameter can be about 1 inch. Further, the SiC detector is capable of operating at elevated temperatures (in excess of about 500° C.) and in high radiation fields (about 50,000 R/hr). Furthermore, one of the key characteristics of the SiC detector is its ability to operate in neutron pulse mode when exposed to high gamma-ray fields.

A counting device or counting electronics is provided which is operable to and capable of counting the signals which are generated by the one or more neutron detectors. The neutron detector and counting device or counting electronics are electrically connected or coupled by a connecting means or mechanism such as, but not limited to a cable, which transfer the signals counted by the counting device or counting electronics. The counted signals are received as input in a signal analyzer. The signal analyzer is operable to and capable of determining the reactivity of the fuel assemblies in the spent fuel pool based on the counted signals. These components are connected or coupled to a computer system which has a software program, such as a computer code, which contains an axial flux curve or shape index. This index is based on analytical or predetermined data. The software program is operable to and capable of correlating the counted signals with the axial flux curve or shape index to evaluate the subcriticality of the spent fuel pool.

Additional equipment includes a high voltage supply to power the neutron detector system and a power supply for the counting device or counting electronics.

In certain embodiments, in a spent fuel pool of a nuclear power plant, one or more SiC diodes are mounted within a watertight housing. Within the housing, the SiC diode is electrically connected to a watertight cable that transfers signals resulting from neutron interactions in the spent fuel pool to one or more counting electronics. Signal pulses will be counted and the count rate will be determined by a computer, which will then determine and display the reactivity of the fuel assemblies in the spent fuel pool.

Figure 2:
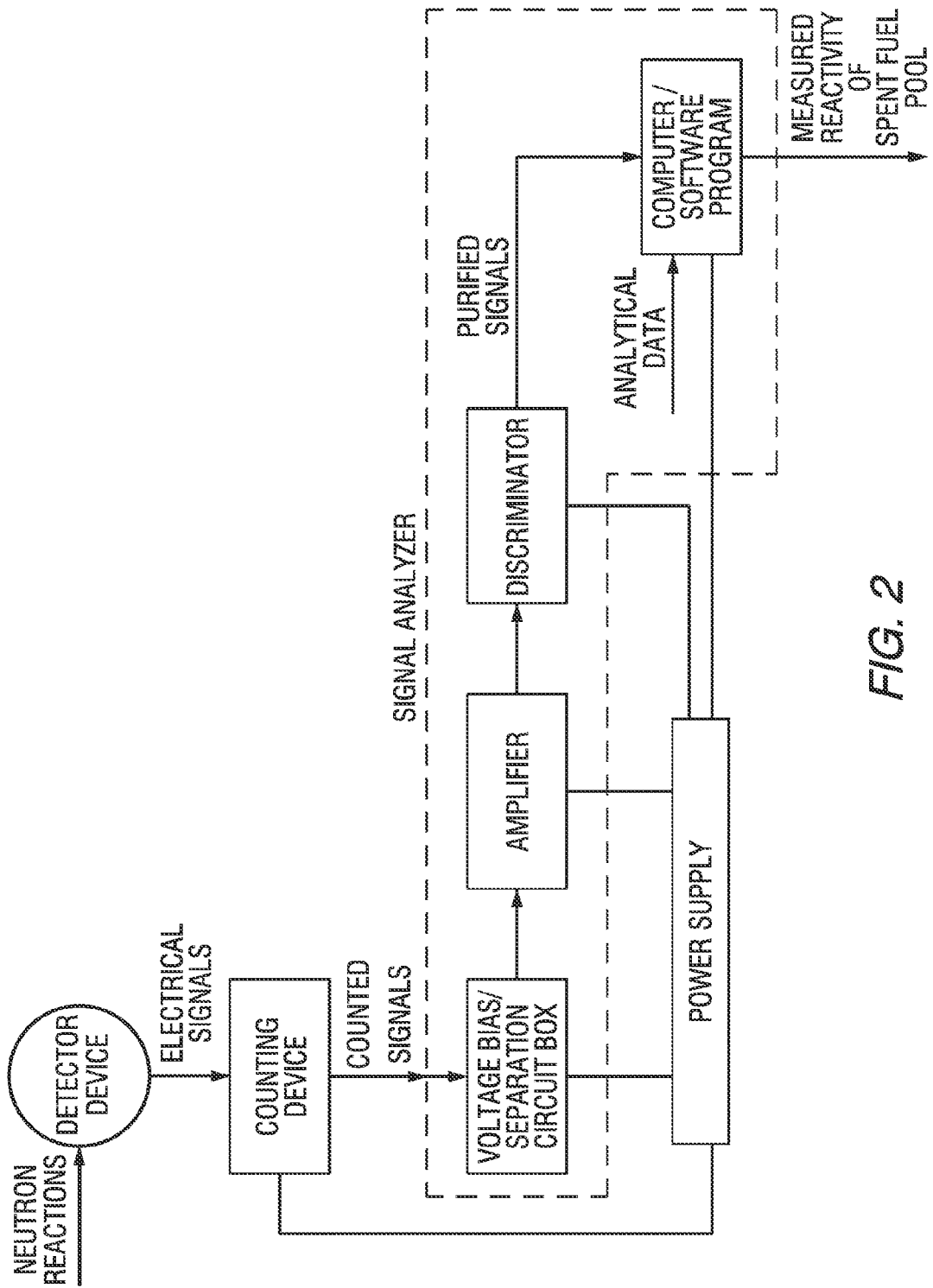
FIG. 2 is a schematic showing the components of a spent fuel pool measuring and monitoring system, in accordance with certain embodiments of this invention.

FIG. 2 is a schematic of a spent fuel pool subcriticality measuring and monitoring system in accordance with certain embodiments of this invention. As shown in FIG. 2, a detector device measures the neutron reactions in the spent fuel pool and generates electrical signals therefrom. A counting device receives and counts the electrical signals generated by the detector device. A signal analyzer receives the counted signals, produces purified signals and determines the measured reactivity of the fuel assemblies in the spent fuel pool. The signal analyzer includes a voltage bias/separation circuit box, an amplifier, a discriminator and a computer. The voltage bias/separation circuit box, amplifier and discriminator are operable to purify the counted signals. The purified signals are then received by the computer as input. The computer also receives analytical data input by the user, such as, for example, pool-specific operating parameters. The computer employs a software program containing an axial flux curve or shape index. The purified signals are correlated with the axial flux curve or shape index. As a result of this correlation, the measured reactivity of the spent fuel pool is obtained for use in evaluating the subcriticality of the pool. Further, the spent fuel pool subcriticality measuring and monitoring system shown in FIG. 2 includes a power supply.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A spent fuel pool flux measurement system for measuring and monitoring axial flux to determine subcriticality, in a nuclear power plant, which comprises:
    a spent fuel pool;
    a neutron source located in the spent fuel pool;
    an analytical tool to generate analytical axial flux curves for a plurality of different concentrations in soluble boron, generate an index of analytical axial flux curves based on the analytical axial flux curves, determine a slope for each analytical axial flux curve and determine an effective multiplication factor of neutrons based on the slope;
    one or more neutron detectors installed in the spent fuel pool and arranged to generate signals resulting from neutron interactions in the spent fuel pool;
    a counting device to receive and count said signals generated by the one or more neutron detectors;
    a connecting means to electrically connect the one or more neutron detectors to the counting device;
    a signal analyzer to receive counted signals from the counting device and to determine reactivity of fuel assemblies in the spent fuel pool based on counted signals;
    a power supply unit for the neutron detectors, the counting device and the signal analyzer; and
    a computer coupled to the signal analyzer and configured to store the index of analytical axial flux curves, generate a measured axial flux curve, determine a slope of the measured axial flux curve and correlate the slope of the measured axial flux curve with a slope of an axial flux curve in the index of analytical axial flux curves to obtain a value of a measured effective multiplication factor.

2. The system of claim 1, wherein the one or more neutron detectors comprises at least one silicon carbide semiconductor diode.

3. The system of claim 2, wherein the at least one silicon carbide semiconductor diode operates in neutron pulse mode when exposed to high gamma-ray fields.

4. The system of claim 1, wherein the value of the effective multiplication factor is less than or equal to 0.95 in normal conditions.

5. The system of claim 1, wherein regions of the spent fuel pool having the highest reactivity are determined by Monte Carlo simulations and the index of analytical axial flux curves.

6. The system of claim 1, wherein the nuclear power plant is a pressurized water reactor.

7. The system of claim 1, wherein the plurality of different concentrations in soluble boron is 1500 ppm, 1600 ppm, 1700 ppm, 1800 ppm and 2400 ppm.

8. The system of claim 1, wherein the analytical tool is a Monte Carlo analysis.

* * * * *